Figure 1:
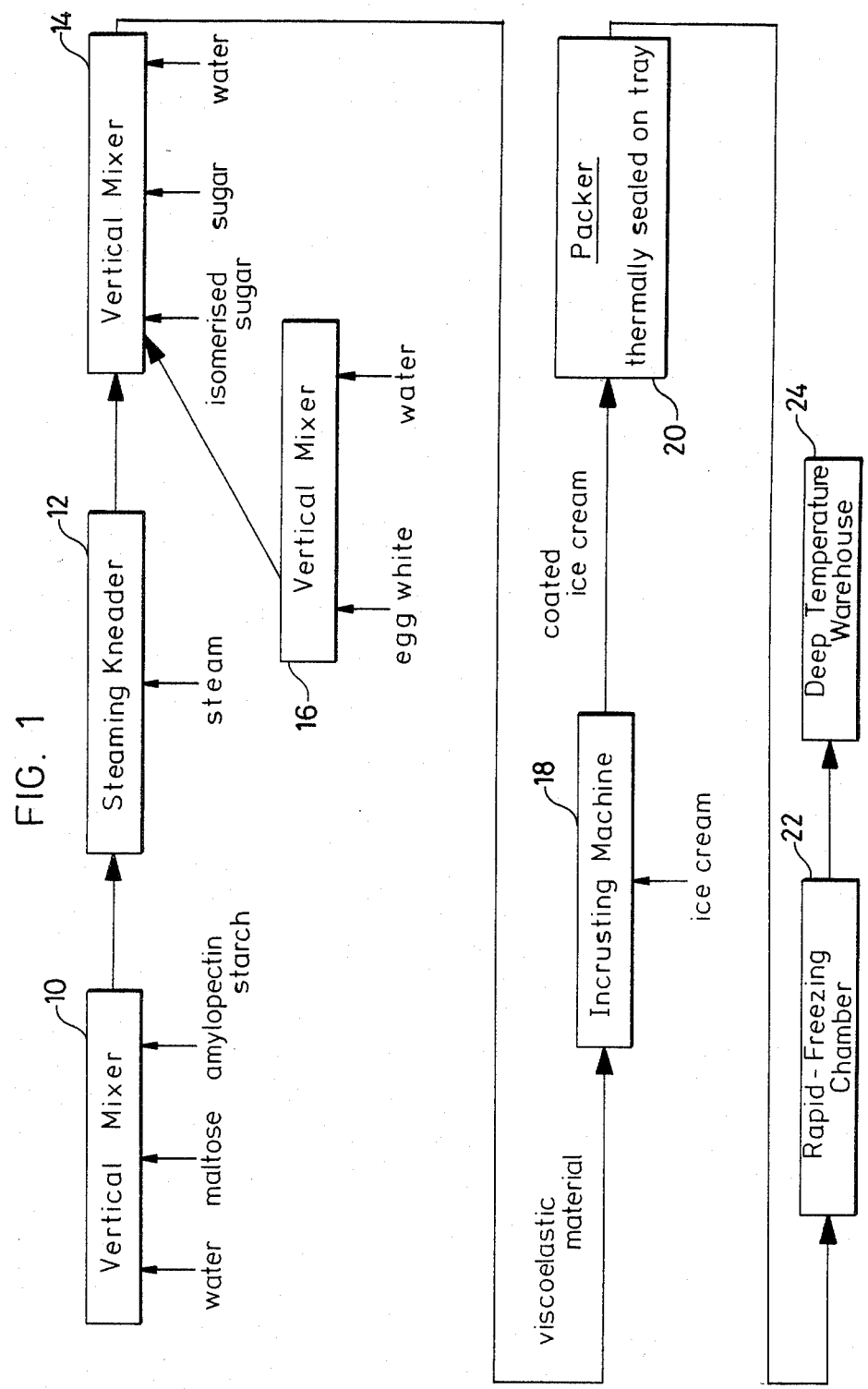

United States Patent [19]

Kato et al.

[11] Patent Number: 4,525,365

[45] Date of Patent: Jun. 25, 1985

[54] COATED FROZEN-DESSERT AND A PROCESS FOR PREPARATION THEREOF

[75] Inventors: Yukiteru Kato; Kazuhiro Watanabe, both of Urawa, Japan

[73] Assignee: Lotte Co., Ltd., Tokyo, Japan

[21] Appl. No.: 556,904

[22] Filed: Dec. 1, 1983

[51] Int. Cl.³ .......................... A23G 9/00; A23G 9/24
[52] U.S. Cl. .................................... 426/101; 426/139; 426/283; 426/284; 426/661; 426/100
[58] Field of Search .............. 426/101, 139, 283, 284, 426/661, 100

[56] References Cited

U.S. PATENT DOCUMENTS

| | | | |
|---|---|---|---|
| 2,404,177 | 7/1946 | Jetschmann | 426/283 |
| 3,441,418 | 4/1969 | Nishikiori | 426/283 |
| 4,209,536 | 6/1980 | Dogliotti | 426/283 |
| 4,275,647 | 6/1981 | Chambers et al. | 426/283 |
| 4,427,703 | 1/1984 | Schäfer | 426/101 |

*Primary Examiner*—Jeanette Hunter
*Attorney, Agent, or Firm*—Young & Thompson

[57] ABSTRACT

A novel frozen-dessert coated with a viscoelastic material is disclosed. The viscoelastic material is prepared by mixing and kneading starch of substantially amylopectin with saccharides and water. Preferably, the starch is selected from starch of glutinous rice, corn or glutinous corn.

6 Claims, 1 Drawing Figure

COATED FROZEN-DESSERT AND A PROCESS FOR PREPARATION THEREOF

FIELD OF THE INVENTION

This invention relates to a novel coated frozen-dessert and its preparation, more particularly to a coated frozen-dessert which may be picked up and eaten directly with the fingers and which comprises a frozen-dessert coated with a viscoelastic material of amylopectin starch, saccharides and water, and its preparation.

BACKGROUND OF THE INVENTION

Heretofore, frozen-desserts, such as ice cream, have been formed in a stick shape or filled into a cup in order to avoid direct contact with the fingers. For this purpose various types of frozen-desserts coated with edible foodstuff have also been proposed for example, ice cream filled in a cone cup, enveloped by so-called "chou", rolled into crepes or coated with chocolate. In principle, the ice cream must be coated or enveloped with an edible foodstuff immediately before eating. Otherwise, problems may arise if the coated or enveloped ice cream is frozen and stored for a long time. Namely, the ice cream may deteriorate with loss of water content, with water freezing, or with drying, hardening and cracking. In order to prevent such deterioration, there has been proposed an ice cream enveloped with a sponge cake, in which a contact portion is provided with a water-impermeable layer (see Japanese U.M. Publication 54957/80). Such approach has the disadvantage of being time-consuming in production. Accordingly, due to the absence of suitable coating material and method, the conventional ice cream filled in the cone cup or enveloped by "chou" has been prepared heretofore, notwithstanding it has disadvantages as described hereinbefore, such as deterioration with loss of water content, loss of flavor and the like.

Now it has been found that a viscoelastic coating of amylopectin starch, saccharides and water may significantly prolong the storage life of the frozen-dessert, such as ice cream.

SUMMARY OF THE INVENTION

Accordingly, an object of the invention is to provide a coated frozen-dessert, which comprises a frozen-dessert coated with an edible viscoelastic material prepared by mixing starch of amylopectin with saccharides and water with heating.

Another object of the invention is to provide a process for preparing a coated frozen-dessert, which comprises the steps of:
adding portions of saccharides and water to starch of amylopectin followed by kneading and steaming;
adding to the steamed mass the remaining portions of saccharides and water as well as, if desired, a small amount of egg white, coloring agent and flavor followed by kneading to form a viscoelastic material;
cooling and shaping the material into a cylinder;
filling a frozen-dessert into the cylinder;
cutting the filled cylinder into a predetermined length followed by closing both cut ends; and
finally freezing the resulting product.

PREFERRED EMBODIMENTS OF THE INVENTION

The viscoelastic material useful in the invention may retain the softness of ice cream without hardening below a temperature of about $-15°$ C., does not deteriorate even if contacted with ice cream for a long time, may be extended into a thin skin (or film) thereby to allow the ice cream to be coated with the skin of an appropriate thickness, may keep its shape at the low temperatures, and may allow the coated ice cream to be picked up and eaten directly with the fingers.

The advantages as described hereinbefore may be achieved by the viscoelastic coating material of starch of amylopectin, which is distinguished from usual starches by containing 20-30% of amylose in addition to the amylopectin.

As typical starches of amylopectin, there may be mentioned glutinous rice and a purified starch therefrom, a glutinous corn or the like which contains substantially amylopectin alone.

The weight ratio of the amylopectin starch to the saccharides in the viscoelastic material according to the invention is in the range 1:1-2.5. Above the ratio of 2.5, the material loses its viscoelasticity to become undesirably pasty. Below the ratio of 1, on the other hand, the material can freeze and harden at low temperature. The water content of the viscoelastic material is in the range of 20-40% by weight, preferably 25-30%. Below 20% the viscoelasticity is lost while freezing at low temperature may occur above 40%.

As the saccharides useful in the invention there may be mentioned sucrose, isomerized sugar, invert sugar, maltose, starch hydrolyzate and others.

To prepare the viscoelastic material, the amylopectin starch is mixed with saccharides and water in a mixer followed by kneading and steaming. In this initial operation the saccharides may be used in an amount of 20-30% of the total saccharides to be used, while water may be used in an amount of 70-80%. Then, the remaining 70-80% of the saccharides and 20-30% of water are added to the resulting steamed mass and then kneaded thoroughly to form the viscoelastic material. In the latter operation, a coloring agent, a flavor and egg white may be incorporated, if desired. The egg white may be incorporated in the form of an aqueous solution or whipped form for enhancing the coloring effect.

In order to coat the frozen-dessert with the viscoelastic material, a small amount of the viscoelastic material may be thinly extended to form a skin which envelops the frozen-dessert, such as ice cream. Alternatively, a large amount of the viscoelastic material may be shaped into the form of a cylinder, into which is filled the frozen-dessert and then cut in any suitable length followed by closing both cut ends. Alternatively, an automatic enveloping machine may be used for enveloping the frozen-dessert with the viscoelastic material. In either case, the frozen-dessert, such as ice cream, may be entirely enveloped within the viscoelastic skin while being directly contacted thereby. The coated frozen-dessert may be then packed, frozen and stored in a warehouse at low temperature.

The coated frozen-dessert according to the invention may be produced continuously on a large scale in a modern process, may be stored without deterioration for a long time, may keep its softness with viscoelasticity and may be handled directly with the fingers.

The invention will be described hereinbelow with reference to the accompanying drawing, which is a flow diagram of a process for preparing the coated frozen-dessert according to the invention.

45 kg of maltose was dissolved into 90 Kg of hot water. The resulting maltose solution was put in a vertical mixer 10 containing 100 Kg of amylopectin starch and then kneaded to give a dough, which in turn was steamed in a steaming vessel 12 for 30–60 minutes. The steamed mass was then put into another vertical mixer 14 and kneaded at a low speed. Then, 135 Kg of sugar was added in three portions with continuous kneading. Thereafter, 20 Kg of isomerized sugar was added in two portions followed by 12.5 Kg water with continuous kneading. Finally 25 Kg of egg white, which had previously been whipped with 17.5 Kg of water in a further vertical mixer 16, was added thereto and the material was kneaded for about 10 minutes at a moderate or high speed to give 423 Kg of a viscoelastic material. An automatic incrusting machine 18 of Leon type was supplied at its center hopper with ice cream and at its side hopper with the viscoelastic material to form a number of coated ice cream products, which were placed on a tray. The tray was then thermally sealed in a packer 20 and passed to a rapid-freezing chamber 22 to freeze the products, which were stored in a warehouse 24 at low temperature.

What is claimed is:

1. A process for preparing a coated frozen dessert, which comprises adding saccharides and water to amylopectin starch with the weight ratio of the starch to the saccharides being in the range of 1:1 to 1:2.5 and the water being present in the amount of 20–40% by weight of the whole, kneading and heating the mixture thus produced, adding to the kneaded mixture further saccharides and further water and further kneading the mixture to form a viscoelastic material, cooling and forming the material into a layer, encasing a frozen dessert in the layer, and cooling the resulting product.

2. A process as claimed in claim 1, in which said amylopectin starch is selected from the class consisting of glutinous rice starch, corn starch and glutinous corn starch.

3. A process as claimed in claim 1, in which said further saccharides are 70–80% of the total saccharides and said further water is 20–30% of the total added water.

4. A process as claimed in claim 1, in which said heating is performed by steaming.

5. A process as claimed in claim 1, in which said layer is of a cylinder and said frozen dessert is filled into said cylinder.

6. A coated frozen dessert produced by the process of claim 1.

* * * * *